United States Patent Office 3,804,938
Patented Apr. 16, 1974

3,804,938
HAZE INHIBITION IN CONTAINERS FABRICATED FROM NITRILE POLYMERS
Cheh-Jen Su, Alsip, Ill., assignor to Continental Can Company, Inc., New York, N.Y.
No Drawing. Filed June 7, 1972, Ser. No. 260,642
Int. Cl. B29c 25/00
U.S. Cl. 264—232
13 Claims

ABSTRACT OF THE DISCLOSURE

Changes in the optical clarity of nitrile polymer containers exposed to aqueous media at elevated temperatures are inhibited by incorporating a polyhydric alcohol in the aqueous media.

BACKGROUND OF THE INVENTION (1) Field of the invention

This invention relates to containers fabricated from nitrile polymers and more particularly to a method for inhibiting haze formation in such containers.

(2) Prior art

Thermoplastic materials have already been used for manufacturing containers and in particular bottles which are fabricated by blow molding. The thermoplastic compositions from which the bottles are fabricated are suitable for use from the standpoint of product potability and general mechanical requirements.

A class of polymers that is finding increasing application for plastic bottle fabrication are thermoplasitc polymers having a high nitrile monomer content in the order of 60% or more, such as the copolymers of olefinically unsaturated nitriles such as acrylonitrile, methacrylonitrile, and ethylenically unsaturated comonomers such as alkyl acrylates, styrene and graft copolymers of the nitrile copolymers with diene rubbers.

Nitrile polymers exhibit high optical clarity and transparency which render the polymers especially suitable for the fabrication of beverage containers.

One drawback to the use of nitrile polymers in container fabrication is that the polymer is sensitive to moisture at elevated temperature. Containers used for food and beverage packaging are exposed to water at elevated temperatures at various times during the packaging operation. For example, the containers are washed with hot water preparatory to being filled with product and are also exposed to water at elevated temperatures if pasteurization or sterilization of the packaged product is required after the container is filled. Exposure of the nitrile polymer container to moisture at elevated temperatures causes the container to become hazy and the optical clarity of the container is substantially reduced. Changes in optical clarity are unacceptable as containers having reduced clarity do not provide the consumer with a true view of the contents of the package and in general, present an unesthetic appearance to the consumer. The incorporation of adjuvants to maintain the optical clarity of the nitrile polymer resin is undesirable as many of the known heat stabilizers are toxic and hence not suitable for food containers.

It has been unexpectedly discovered that when containers fabricated from nitrile polymer resins are exposed to aqueous media at elevated temperatures, haze formation which often accompanies such exposure is substantially reduced by incorporating about 5 to 30 percent by volume of a polyhydric alcohol in the aqueous media to which the containers are exposed.

SUMMARY OF THE INVENTION

In accordance with the process of the present invention changes in the optical clarity of containers fabricated from nitrile polymers are substantially inhibited during exposure to aqueous media at elevated temperatures wherein about 5 to about 30% by volume of a polyhydric alcohol is incorporated in the aqueous media to which the containers are exposed.

The substantial inhibition of optical clarity changes in containers fabricated from nitrile polymers resulting from the practice of the present invention enables the container manufacturer to consistently meet optical clarity specifications set for the containers which undergo pasteurization or other exposure to water at elevated temperatures.

PREFERRED EMBODIMENTS

The class of nitrile polymers from which the containers of the present invention may be fabricated include those polymers prepared by polymerizing a major portion of an olefinically unsaturated nitrile and a minor portion of at least one other olefinically unsaturated monomer copolymerizable with the nitrile The olefinically unsaturated nitriles used to prepare the nitrile polymer are the alpha, beta-olefinically unsaturated mononitriles having the structure

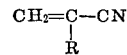

wherein R is hydrogen, a lower alkyl group having 1–4 carbon atoms or a halogen. Such compounds include acrylonitrile, alpha-chloroacrylonitrile, alpha-fluoroacrylonitrile, methacrylonitrile, ethacrylonitrile and the like. The most preferred olefinically unsaturated nitriles used in preparing the nitrile polymer are acrylonitrile and methacrylonitrile and mixtures thereof.

Exemplary monomers which can be copolymerized with the nitrile monomer include one or more unsaturated monomers such as the acrylate ester including methyl acrylate, ethyl acrylate, the propyl acrylates, the butyl acrylates, the amyl acrylates, the hexyl acrylates, cyclohexyl acrylate, phenyl acrylate, the methacrylate esters such as methyl methacrylate, the butyl methacrylates, the amyl methacrylate, the hexyl methacrylates, cyclohexyl methacrylate, vinyl esters such as vinyl acetate, vinylpropionate, vinyl butyrate, lower alpha olefins of from 2 to 8 carbon atoms, e.g., ethylene, propylene, isobutylene, butene-1, pentene-1, and their halogen and aliphatic substituted derivatives as represented by vinyl chloride, vinylidene chloride, etc.; monovinylidene aromatic hydrocarbon monomers such as styrene, alpha methyl styrene, vinyl toluene, alpha chlorostyrene, ortho chlorostyrene, para chlorostyrene meta chlorostyrene, ortho methyl styrene, para methyl styrene, ethyl styrene, isopropyl styrene, dichloro styrene and vinyl naphthalene.

The nitrile polymers of the present invention are generally copolymers which contain about 60 to about 99 percent by weight of the nitrile monomer and about 1 to about 40 percent by weight of one or more other unsaturated monomers.

It is to be clearly understood that the process of the present invention can be utilized and is effective with any polymer having as its major constituent a nitrile monomer as hereinbefore defined. Thus, the process of the present invention is equally effective in the treatment of nitrile polymers which include in the resin composition a synthetic or natural rubber component such as polybutadiene, isoprene, neoprene, nitrile rubbers, butadiene-acrylonitrile copolymers, ethylene-propylene copolymers and chlorinated rubbers. This rubbery component may be incorporated into the nitrile polymer at a concentration of up to 25 percent by weight and preferably about 1 to about 20 percent by weight by any of the methods which are well known to those skilled in the art e.g., direct polymerization of monomers, polyblends, grafting the nitrile monomer mixture onto the rubber backbone and physical admixture of the rubber component. Especially preferred are graft copolymers of a nitrile monomer and a second comonomer on a rubbery backbone of the type disclosed in U.S. 3,426,102 and 3,615,710 which are comprised of about 70 to 99 percent by weight of an olefinic nitrile/alkyl acrylate or monovinylidene aromatic hydrocarbon copolymer containing at least 60% by weight of the olefinic nitrile graft polymerized with 1 to 20 percent by weight of a diene-nitrile rubber. Thus, the term "nitrile polymer" as used herein includes blends with rubber, graft copolymers with rubber as well as unblended and ungrafted nitrile copolymers.

The polyhydric alcohols which are incorporated in the aqueous media to which the nitrile polymer containers are exposed include any polyhydric alcohol which is soluble in water and has a boiling point at least as high as the temperature to which the container will be exposed. Generally, the maximum temperature of aqueous media to which the nitrile polymer container will be exposed to during packaging operations will be pasteurization temperatures which range from 54° to 71° C. and polyhydric alcohols having boiling points greater than this temperature range are preferred in the practice of the present invention.

Illustrative examples of polyhydric alcohols which may be employed in the practice of the present invention are aliphatic polyhydric alcohols having 2 or more hydroxyl groups, and generally 2 to 6 hydroxyl groups such as ethylene glycol, diethylene glycol, triethylene glycol, pentamethylene glycol, propylene glycol, 1,3-propanediol, 1,4-butanediol, 1,6-hexandiol, trimethylol ethane, trimethylol propane, glycerol, erythritol, arabitol and sorbitol.

The polyhydric alcohol is incorporated in the aqueous media to which the nitrile polymer container is exposed at a concentration of about 5 to about 30% by volume and a concentration of about 10 to about 25 percent by volume is preferred.

Containers of the type used in the present invention are fabricated from the nitrile polymer by any conventional molding means such as blow molding or extrusion blow molding. Molding temperatures generally vary from about 400 to 500° F.

The following example is set forth for the purpose of illustration only and is not to be construed as limiting the present invention except as set forth in the claims. All percentages are by volume unless otherwise specified.

EXAMPLE 1

Plaques 2" x 2" x 0.04" were compression molded from Barex 210, a commercially available nitrile polymer consisting of an acrylonitrile/methyl acrylate-acrylonitrile/butadiene graft copolymer containing about 69% acrylonitrile, 22% methyl acrylate and 9% butadiene rubber. The plaques were placed in a water bath containing varying amounts of different aliphatic polyhydric alcohols at 65° C. for 2 hours. The plaques were removed from the bath, and allowed to remain exposed to the air for 24 hours.

The plaques were inspected for changes in optical clarity using a Gardner Pivotable-Sphere Hazemeter following the procedure of ASTM D1003-61. This procedure measures the luminous transmittance of transparent plastics. In this procedure, the haze of a specimen is that percentage of transmitted light which in passing through the specimen deviates from the incident by forward scattering. Specimens with haze values greater than 30% are considered to be translucent.

The haze values for the plaques are recorded in Table I.

For purposes of comparison, plaques were also compression molded from Barex resin and exposed to a water bath for 2 hours at 65° C. In the comparison tests, the water bath to which the molded resin was exposed either contained no polyhydric alcohol or contained surface-active agents outside the scope of the present invention. The haze values of these comparative plaques designated by the symbol C are also recorded in Table I.

TABLE I

| Test No. | Bath additive | Additive concentration, percent | Haze value of plaque Before exposure to bath | Haze value of plaque After exposure to bath | Percent reduction in haze value [1] |
|---|---|---|---|---|---|
| $C_1$ | | | 6.2 | 41.0 | |
| 1 | Ethylene glycol | 5 | 6.0 | 33.0 | 23.0 |
| 2 | do | 10 | 6.2 | 22.8 | 52.3 |
| 3 | do | 20 | 6.2 | 20.7 | 58.3 |
| 4 | do | 30 | 6.2 | 16.1 | 71.5 |
| 5 | Propylene glycol | 10 | 8.2 | 28.3 | 42.2 |
| 6 | 1,3-propanediol | 10 | 8.2 | 28.6 | 41.4 |
| 7 | 1,4-butanediol | 10 | 6.2 | 27.4 | 39.1 |
| 8 | Glycerol | 10 | 6.2 | 27.9 | 37.6 |
| $C_2$ | Sodium lauryl sulfate | [2] 10 | 6.2 | 52.6 | |
| $C_3$ | Iqepol co-630 [3] | 10 | 6.2 | 44.7 | |

[1] When compared to haze value of Test No. $C_1$.
[2] 10% by weight.
[3] Iqepol co-630 is nonylphenoxypoly(ethyleneoxy)ethanol.

EXAMPLE 2

The procedure of Example 1 was repeated with the exception that the plaques were compression molded from a copolymer of 80% by weight acrylonitrile and 20% by weight styrene grafted onto a styrene butadiene rubber. The haze values of this plaques before and after exposure to a water bath for 1 hour at 75° C. is recorded in Table II below:

TABLE II

| Test No. | Bath additive | Additive concentration, percent | Haze value of plaque Before exposure to bath | Haze value of plaque After exposure to bath | Percent reduction in haze value |
|---|---|---|---|---|---|
| $C_4$ | | | 10.8 | 18.5 | |
| 9 | Ethylene glycol | 10 | 10.8 | 13.9 | 59.7 |

What is claimed is:

1. A method for inhibiting changes in optical clarity in containers molded from a resin having a nitrile content of at least 60% and exposed to an aqueous media at elevated temperatures which comprises molding the container from the resin, incorporating a polyhydric alcohol in the aqueous media at a concentration of between about 5 to about 30% by volume and then exposing the molded article to the aqueous media.

2. The method of claim 1 wherein the resin is comprised of (1) 60 to 99 percent by weight of an alpha, beta-olefinically unsaturated mononitrile having the structure

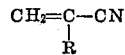

wherein R is selected from the group consisting of a lower alkyl group having 1 to 4 carbon atoms or a halogen and (2) 1 to 40 percent by weight of at least one other olefinically unsaturated monomer copolymerizable with the mononitrile.

3. The method of claim 1 wherein the mononitrile is acrylonitrile.

4. The method of claim 1 wherein the olefinically unsaturated monomer is methyl acrylate.

5. The method of claim 1 wherein the resin is a copolymer of a acrylonitrile-methyl acrylate copolymer.

6. The method of claim 1 wherein the resin is a graft copolymer of an acrylonitrile-methyl acrylate copolymer and an acrylonitrile-butadiene rubber.

7. The method of claim 1 wherein the resin is a copolymer of acrylonitrile and styrene.

8. The method of claim 1 wherein the resin is a graft copolymer of an acrylonitrile-styrene copolymer and a styrene-butadiene rubber.

9. The method of claim 1 wherein the polyhydric alcohol is ethylene glycol.

10. The method of claim 1 wherein the polyhydric alcohol is propylene glycol.

11. The method of claim 1 wherein the polyhydric alcohol is 1,3-propanediol.

12. The method of claim 1 wherein the polyhydric alcohol is 1,4-butanediol.

13. The method of claim 1 wherein the polyhydric alcohol is glycerol.

References Cited

UNITED STATES PATENTS

| | | | |
|---|---|---|---|
| 2,570,200 | 10/1951 | Bruson | 264—182 |
| 3,220,917 | 11/1965 | Lowes | 260—29.6 ANX |
| 3,287,304 | 11/1966 | Fujisaki et al. | 260—29.6 AQ |
| 3,451,538 | 6/1969 | Trementozzi | 99—171 LP |
| 3,524,536 | 8/1970 | Terenzi et al. | 206—45.31 |
| 3,615,710 | 10/1971 | Lee et al. | 99—171 LP |

OTHER REFERENCES

Chem. Abstracts, v. 73 (1970), #78473h.
Chem. Abstracts, v. 75 (1971), #89287t.

MORRIS O. WOLK, Primary Examiner
T. W. HAGAN, Assistant Examiner

U.S. Cl. X.R.

21—58; 260—29.6 AN; 264—340; 426—415